(12) United States Patent
Kang

(10) Patent No.: US 9,216,722 B2
(45) Date of Patent: Dec. 22, 2015

(54) SEALING MEMBER FOR MASTER CYLINDER

(71) Applicant: MANDO CORPORATION, Pyeongtaek-si, Gyeonggi-do (KR)

(72) Inventor: Dong-Gu Kang, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/308,631

(22) Filed: Jun. 18, 2014

(65) Prior Publication Data

US 2015/0069716 A1 Mar. 12, 2015

(30) Foreign Application Priority Data

Sep. 9, 2013 (KR) .................. 10-2013-0107668

(51) Int. Cl.
*B60T 11/236* (2006.01)

(52) U.S. Cl.
CPC .................... *B60T 11/236* (2013.01)

(58) Field of Classification Search
CPC .. B60T 11/236; F16J 15/3232; F16J 15/3236; F16J 9/00
USPC .......... 277/436–439, 457, 549, 552, 553, 558
See application file for complete search history.

(56) References Cited

U.S. PATENT DOCUMENTS

| 5,328,178 | A  | * | 7/1994 | Nies ............................. 277/438 |
| 6,446,976 | B1 | * | 9/2002 | Key et al. ...................... 277/367 |
| 7,520,132 | B2 |   | 4/2009 | Chiba |
| 2010/0066028 | A1 | * | 3/2010 | Aoki et al. .................... 277/353 |
| 2010/0154407 | A1 | * | 6/2010 | Bernadat et al. ............... 60/533 |
| 2014/0060037 | A1 | * | 3/2014 | Lhuillier et al. ............... 60/533 |

* cited by examiner

*Primary Examiner* — Gilbert Lee
(74) *Attorney, Agent, or Firm* — McDermott Will & Emery LLP

(57) ABSTRACT

Disclosed is a sealing member for a master cylinder. The sealing member for a master cylinder, which is formed in a ring shape and is installed between an inner surface of a cylinder body and an outer surface of a piston, includes an inner wing part configured to contact the outer surface of the piston, an outer wing part configured to contact the inner surface of the cylinder body, and a sealing rear wall part configured to connect the inner wing part and the outer wing part. The sealing rear wall part is provided with an oil passage to connect an oil entrance formed at the inner wing part and an oil entrance formed at the outer wing part, and the oil passage includes a retardation passage which is longer than a shortest straight-line distance which directly connects the oil entrances.

8 Claims, 5 Drawing Sheets

SEALING MEMBER FOR MASTER CYLINDER

CROSS-REFERENCE TO RELATED APPLICATION

This application claims the benefit of Korean Patent Application No. 2013-0107668, filed on Sep. 9, 2013 in the Korean Intellectual Property Office, the disclosure of which is incorporated herein by reference.

BACKGROUND

1. Field

Embodiments of the present invention relate to a sealing member for a master cylinder, and more particularly to, a sealing member for a master cylinder capable of minimizing a phenomenon of non-generation of brake pressure due to invasion of foreign materials.

2. Description of the Related Art

In general, a master cylinder is a device to generate hydraulic pressure in a hydraulic brake system.

A master cylinder includes a cylinder body in which a bore is defined, and a piston installed in the bore so as to be advanced or retracted in the bore. A sealing member is installed to the cylinder body to form a hydraulic pressure chamber in which a pressure necessary for braking operation is generated according to advance and retreat of the piston. The piston is formed with communication holes so that liquid may move among a hydraulic pressure chamber, an oil tank and a wheel brake. When the piston is advanced, the communication holes are displaced farther forward than the sealing member, and the liquid in the hydraulic pressure chamber is pressurized, thereby generating brake pressure. On the contrary, when the piston is retracted, the communication holes are displaced farther rearward than the sealing member, and the liquid in the hydraulic pressure chamber is returned to the oil tank, thereby releasing brake pressure.

The sealing member is formed in a ring shape and is fitted in a receiving recess of the cylinder body. The sealing member is referred to as a "cup seal" because of a cup-shaped cross sectional shape thereof.

CITATION LIST

Patent Literature

U.S. Pat. No. 7,520,132 (Apr. 21, 2009)

The afore-mentioned invention discloses a structure in which a passage is formed radially at a rear surface of a cup seal. When a hydraulic pressure chamber becomes vacuous due to release of braking operation, liquid is returned from an oil tank through the passage. Without the passage, liquid may be introduced rapidly into the hydraulic pressure chamber when the braking release operation is completed, which may cause water hamming. If foreign materials are caught in the passage, sealing function may be deteriorated in braking operation, causing the liquid to flow reversely. Therefore, hydraulic pressure may not be generated due to leakage, which may result in a sinking brake pedal leading to a traffic accident.

SUMMARY

It is an aspect of the present invention to provide a sealing member for a master cylinder capable of minimizing a phenomenon of non-generation of brake pressure due to invasion of foreign materials.

Additional aspects of the invention will be set forth in part in the description which follows and, in part, will be obvious from the description, or may be learned by practice of the invention.

In accordance with one aspect of the present invention, a sealing member for a master cylinder, which is formed in a ring shape and is installed between an inner surface of a cylinder body and an outer surface of a piston, includes: an inner wing part configured to contact the outer surface of the piston; an outer wing part configured to contact the inner surface of the cylinder body; and a sealing rear wall part configured to connect the inner wing part and the outer wing part. The sealing rear wall part is provided with an oil passage to connect an oil entrance formed at the inner wing part and an oil entrance formed at the outer wing part, and the oil passage includes a retardation passage which is longer than a shortest straight-line distance which directly connects the oil entrances.

The oil passage may include plural concentric passages formed in a concentric circle shape and plural radial passages connecting the concentric passages in a radial direction, and the radial passages may be arranged in misalignment from each other.

The oil passage may be formed in a spiral shape.

The oil passage may be formed such that a flowing time of fluid that passes through the oil passage is longer than a time taken to form brake pressure in a hydraulic pressure chamber in braking operation.

The retardation passage may include at least one of a circumferential passage formed in a circumferential direction and a slanted passage slanted with respect to the shortest straight-line distance.

As is apparent from the above description, the sealing member for a master cylinder according to the embodiment of the present invention includes the oil passage which is formed in a zigzag, maze or spiral shape. Accordingly, the time taken for the liquid to escape from the hydraulic pressure chamber is prolonged in spite of invasion of foreign materials, thereby effectively minimizing a phenomenon of non-generation of brake pressure in the hydraulic pressure chamber.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
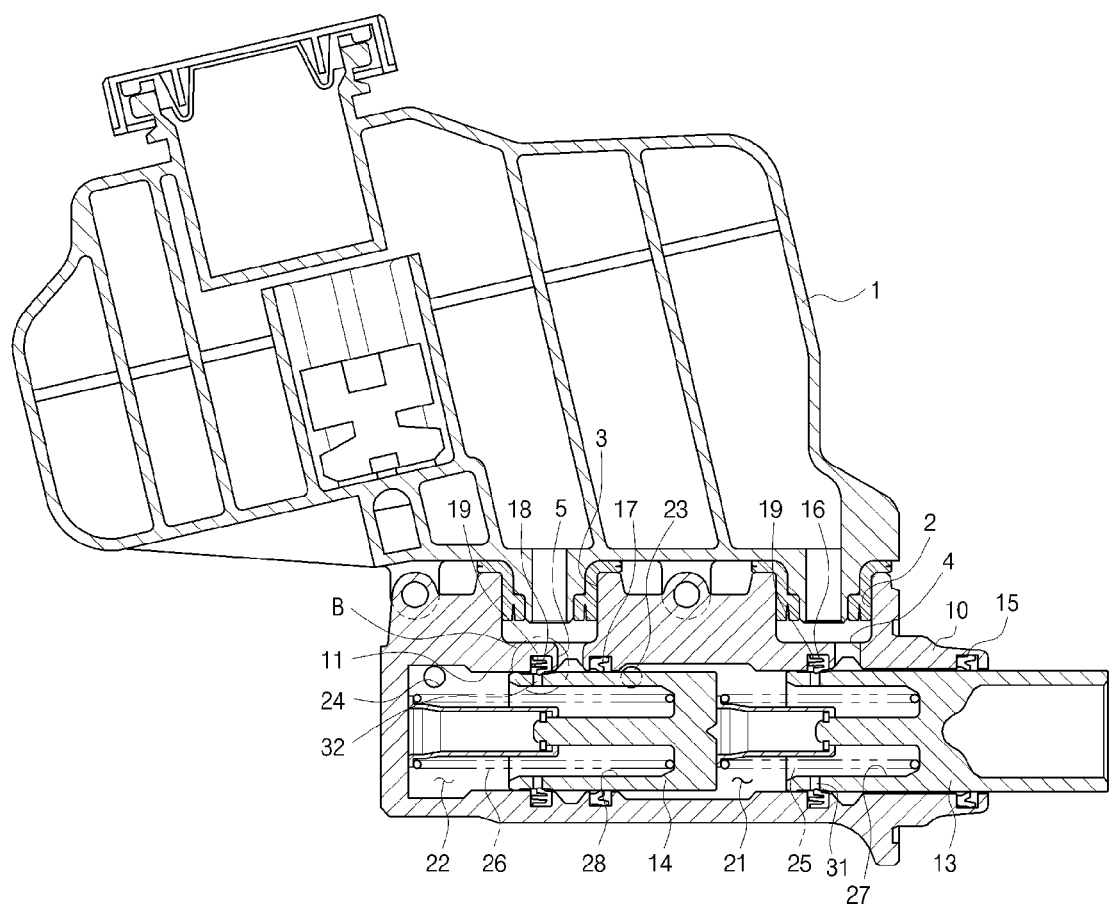
FIG. 1 is a view illustrating a master cylinder including a sealing member according to an exemplary embodiment of the present invention.

Reference will now be made in detail to the embodiments of the present invention, examples of which are illustrated in the accompanying drawings, wherein like reference numerals refer to like elements throughout. In the following description of the present invention, a detailed description of known functions and configurations incorporated herein will be omitted when it may make the subject matter of the present invention rather unclear. In the drawings, the widths, the lengths, the thicknesses, etc. of elements may be exaggerated for convenience of description. Further, in the drawings, the same or similar elements are denoted by the same reference numerals even though they are depicted in different drawings.

FIG. 1 is a sectional view illustrating a master cylinder equipped with a sealing member according to an exemplary embodiment of the present invention.

As shown in the drawing, a master cylinder includes a cylinder body 10 in which a bore 11 is defined, and a first piston 13 and second piston 14 which are arranged in the bore 11 of the cylinder body 10 so as to be advanced or retracted in the bore 11.

First and second sealing members 15 and 16 are installed between an inner surface of the bore 11 and an outer surface of the first piston 13, and third and fourth sealing members 17 and 18 are installed between the inner surface of the bore 11 and an outer surface of the second piston 14.

The sealing members 15, 16, 17 and 18 are fitted respectively in receiving recesses 19 that are indented in the inner surface of the bore 11 and thus, are not moved even when the respective pistons 13 and 14 are advanced or retracted. With this configuration, the inner space of the bore 11 is divided into a first hydraulic pressure chamber 21 between the first piston 13 and the second piston 14, and a second hydraulic pressure chamber 22 between the second piston 14 and an inner end surface of the bore 11.

The cylinder body 10 has a first oil discharge hole 23 formed toward the first hydraulic pressure chamber 21 and a second oil discharge hole 24 formed toward the second hydraulic pressure chamber 22, so that oil in the first and second hydraulic pressure chambers 21 and 22 is discharged through the first and second oil discharge holes 23 and 24 when the first and second hydraulic pressure chambers 21 and 22 are pressed by the first and second pistons 13 and 14.

Accordingly, as the first piston 13 is advanced and acts to press the first hydraulic pressure chamber 21, the second piston 14 is pressed by the pressure of the first hydraulic pressure chamber 21, acting to press the second hydraulic pressure chamber 22. The oil in the first and second hydraulic pressure chambers 21 and 22 is discharged through the first and second oil discharge holes 23 and 24, and is supplied to, e.g., a wheel cylinder (not shown).

A first return spring 25 is installed in the first hydraulic pressure chamber 21 and serves to return the first piston 13 to its initial position after completion of braking operation. Also, a second return spring 26 is installed in the second hydraulic pressure chamber 22 and serves to return the second piston 14 to its initial position. The first and second pistons 13 and 14 have spring receiving grooves 27 and 28 formed in front regions thereof, so that the first and second return springs 25 and 26 may be introduced into the respective grooves 27 and 28.

First and second oil inlet ports 2 and 3 in communication with an oil tank 1 are formed in an upper portion of the cylinder body 10. The first and second oil inlet ports 2 and 3 are respectively held in communication with the first and second hydraulic pressure chambers 21 and 22 through first and second oil inlets 4 and 5.

The first oil inlet 4 is located between the first sealing member 15 and the second sealing member 16, and the second oil inlet 5 is located between the third sealing member 17 and the fourth sealing member 18. The first and second pistons 13 and 14 have a plurality of communication holes 31 and 32 that are perforated from the inner surface to the outer surface thereof, so that the oil, having passed through the first and second oil inlets 4 and 5, may be introduced into the first and second hydraulic pressure chambers 21 and 22 through the communication holes.

The second sealing member 16 and fourth sealing member 18 are formed in a ring shape. Both the sealing members have the same configuration and thus, the following description focuses on the fourth sealing member 18.

Figure 2:
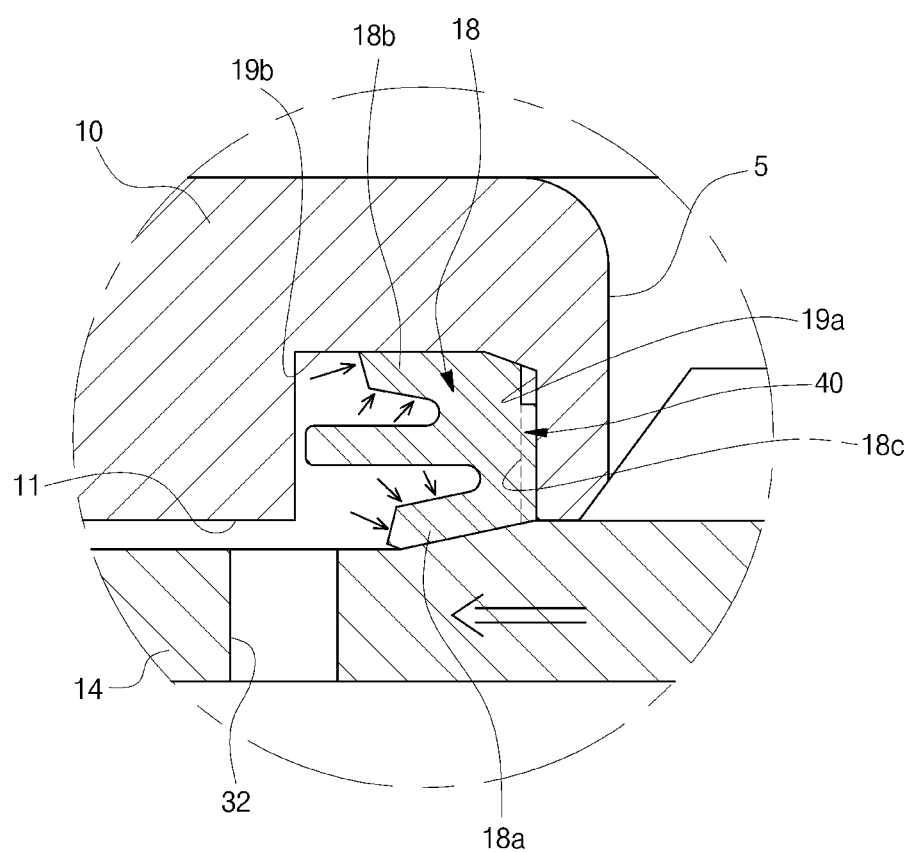
FIGS. 2 and 3 are enlarged views illustrating operation of the sealing member for a master cylinder according to an exemplary embodiment of the present invention.
Figure 3:
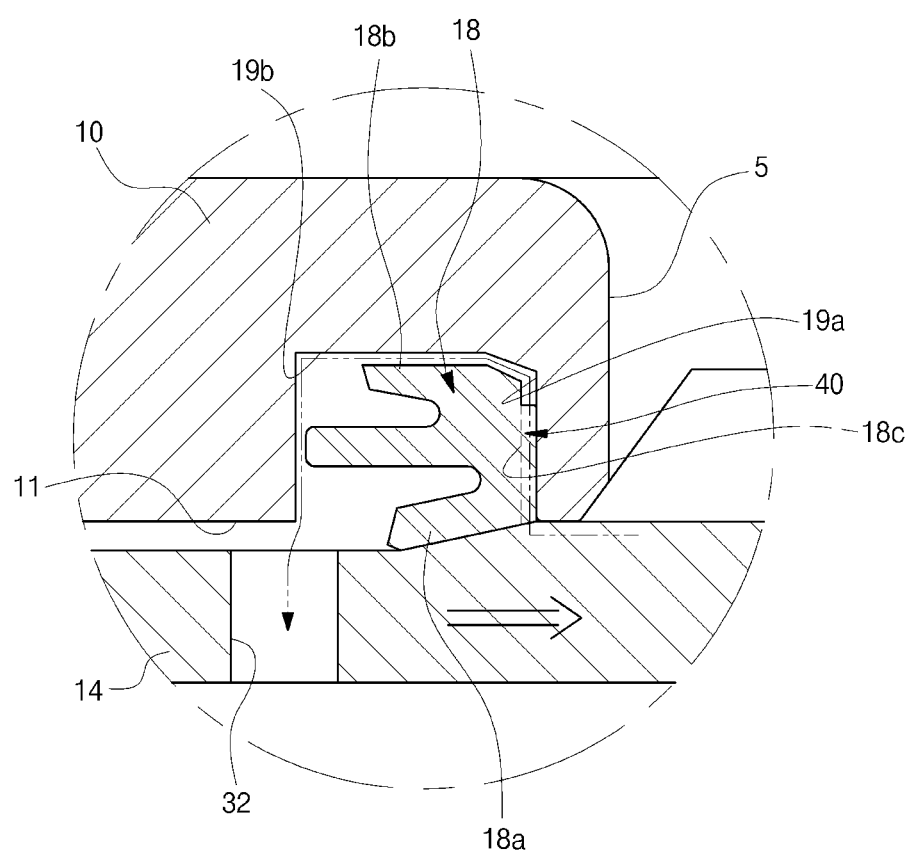

The fourth sealing member 18, as shown in FIGS. 2 and 3, has a cup-shaped form in cross section, and includes an inner wing part 18a that comes into contact with the outer surface of the second piston 14, an outer wing part 18b that comes into contact with an inner surface of the receiving recess 19, and a sealing rear wall part 18c that connects the inner wing part 18a and the outer wing part 18b.

The inner wing part 18a is kept in contact with the outer surface of the second piston 14 and thus, acts to seal the outer surface of the second piston 14. The outer wing part 18b is kept in contact with the inner surface of the receiving recess 19 of the bore and thus, acts to seal the receiving recess. FIG. 2 illustrates a state in which the sealing member 18 is deformed to seal the second hydraulic pressure chamber 22 by the second piston 14 being advanced to press the second hydraulic pressure chamber 22 for braking operation. FIG. 3 illustrates a state in which the sealing member 18 is deformed to fill the second hydraulic pressure chamber 22 with the oil from the oil tank 1 by the second piston 14 being retracted to make the second hydraulic pressure chamber 22 vacuous for braking release operation, thereby forming a passage which is defined by a side wall 19a and a top wall 19b of the receiving recess 19. An arrow in FIG. 3 represents oil flow.

Figure 4:
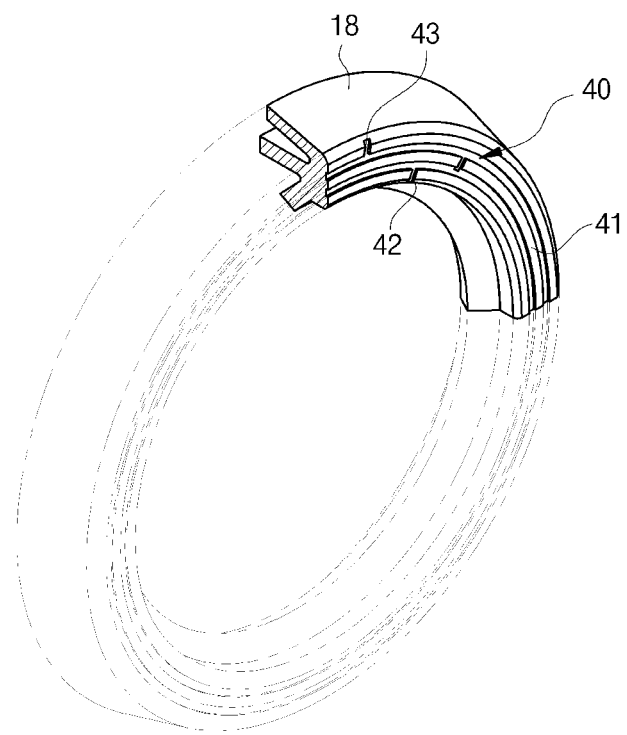
FIG. 4 is a partial cut-out perspective view of the sealing member for a master cylinder according to an exemplary embodiment of the present invention.
Figure 5:
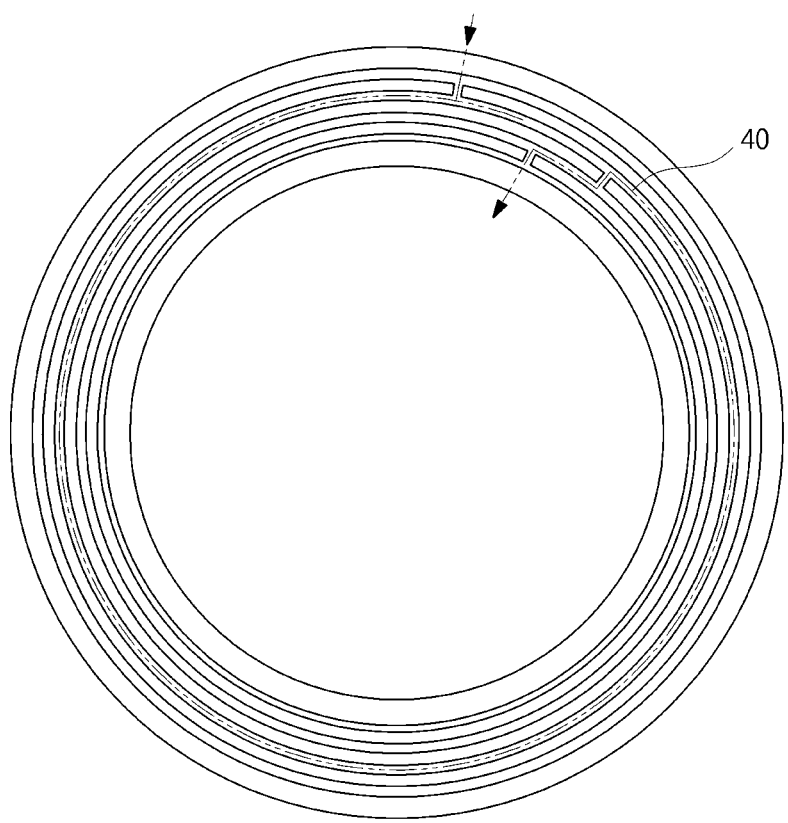
FIG. 5 is a plan view of the sealing member for a master cylinder according to an exemplary embodiment of the present invention.

The sealing rear wall part 18c is kept in contact with the side wall 19a of the receiving recess 19, and has an oil passage 40 through which oil flows. As shown in FIGS. 4 and 5, the oil passage 40 is formed in the rear wall of the ring-shaped sealing member.

In order to form the oil passage 40, the sealing rear wall part 18c is provided with plural concentric ribs 41 which protrude in a concentric circle shape. The concentric ribs 41 are cut into an arc shape by plural recesses that are formed radially.

The oil passage 40 defined between the concentric ribs 41, as shown in FIGS. 4 and 5, is formed in a zigzag shape on the rear wall surface so as to connect a first oil entrance 42 formed at the inner wing part 18a and a second oil entrance 43 formed at the outer wing part 18b.

Since such a zigzag-shaped oil passage 40 provides a relatively long oil flowing time, even though foreign materials invade the space between the sealing member 18 and the receiving recess 19, the backflow time of the oil that moves from the second hydraulic pressure chamber 22 to the oil tank 1 through the second oil inlet 5 in braking operation may be prolonged as much as possible.

For example, by minimizing the amount of oil that flows back from the second hydraulic pressure chamber 22 to the oil tank 1 when the second piston 14 is advanced through time retardation, a sinking brake pedal due to lack of pressure in the hydraulic pressure chamber or braking performance deterioration may be minimized. At this time, the amount of oil that escapes from the second hydraulic pressure chamber 22 to the oil tank 1 due to backflow should be less than the amount of oil that escapes from the second hydraulic pressure chamber 22 through the second oil discharge hole 24. Also, the flowing time of fluid that passes through the oil passage 40 should be longer than the time taken to form brake pressure in the second hydraulic pressure chamber 22 in braking operation.

If the braking operation is released, the second piston 14 is returned to its initial position, and the liquid in the oil tank 1 flows smoothly into the second hydraulic pressure chamber 22 through the oil passage 40 due to a vacuum generated in the second hydraulic pressure chamber 22.

Although it has been shown in this embodiment that the oil passage 40 has a maze shape formed by connecting the concentric passages formed circumferentially between the plural concentric ribs and the radial passages formed by the radial recesses and arranged in misalignment from each other, the shape of the oil passage is not limited thereto. The oil passage 40 may have a shape which spirally winds from an outer portion toward an inner portion on the rear wall surface in order to increase the flowing time of fluid.

The oil passage 40 acts to connect the first oil entrance 42 formed at the inner wing part 18*a* and the second oil entrance 43 formed at the outer wing part 18*b*. Herein, the oil passage 40 may be configured with a retardation passage which is longer than the shortest straight-line distance in a radial direction which directly connects the first oil entrance and the second oil entrance. For example, although not illustrated, the retardation passage may include at least one of a circumferential passage formed in a circumferential direction and a slanted passage slanted with respect to the shortest straight-line distance, thereby effectively prolonging the flowing time of fluid passing between the first oil entrance and the second oil entrance.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sealing member for a master cylinder, which is formed in a ring shape and is installed between an inner surface of a cylinder body and an outer surface of a piston, comprising:
    an inner wing part configured to contact the outer surface of the piston;
    an outer wing part configured to contact the inner surface of the cylinder body; and
    a sealing rear wall part configured to connect the inner wing part and the outer wing part,
    wherein the sealing rear wall part is provided with an oil passage to connect an oil entrance formed at the inner wing part and an oil entrance formed at the outer wing part, and the oil passage includes a retardation passage which is longer than a shortest straight-line distance which directly connects the oil entrances.

2. The sealing member for a master cylinder according to claim 1, wherein the oil passage includes plural concentric passages formed in a concentric circle shape and plural radial passages connecting the concentric passages in a radial direction,
    and wherein the radial passages are arranged in misalignment from each other.

3. The sealing member for a master cylinder according to claim 1, wherein the oil passage is formed in a spiral shape.

4. The sealing member for a master cylinder according to claim 1, wherein the oil passage is formed such that a flowing time of fluid that passes through the oil passage is longer than a time taken to form brake pressure in a hydraulic pressure chamber in braking operation.

5. The sealing member for a master cylinder according to claim 1, wherein the retardation passage includes at least one of a circumferential passage formed in a circumferential direction and a slanted passage slanted with respect to the shortest straight-line distance.

6. The sealing member for a master cylinder according to claim 1, wherein the retardation passage is longer than the shortest straight-line distance independent of pressure.

7. The sealing member for a master cylinder according to claim 1, wherein the oil entrance formed at the inner wing part is circumferentially offset from the oil entrance formed at the outer wing part.

8. The sealing member for a master cylinder according to claim 1, wherein the retardation passage includes a first and second circumferential passage and a radial passage connecting the first and second circumferential passage, the radial passage being circumferentially offset from at least one of the oil entrance formed at the inner wing part or the oil entrance formed at the outer wing part.

* * * * *